United States Patent [19]
Huang et al.

[11] Patent Number: 5,936,859
[45] Date of Patent: Aug. 10, 1999

[54] METHOD AND APPARATUS FOR PERFORMING DECIMATION AND INTERPOLATION OF PCM DATA

[75] Inventors: Hong-Jyeh Huang, San Mateo, Calif.; Andre Bouwer, Toronto, Canada

[73] Assignee: LSI Logic Corporation, Milpitas, Calif.

[21] Appl. No.: 08/632,773

[22] Filed: Apr. 15, 1996

[51] Int. Cl.[6] .................................................. G06F 17/00
[52] U.S. Cl. ........................................ 364/400.01; 84/605
[58] Field of Search ............................... 375/372; 84/604, 84/605, 606, 607, 622; 381/119; 364/400.1

[56] References Cited

U.S. PATENT DOCUMENTS

| | | |
|---|---|---|
| 4,658,691 | 4/1987 | Ishibashi . |
| 4,731,646 | 3/1988 | Kliem . |
| 4,941,156 | 7/1990 | Stern et al. . |
| 5,276,688 | 1/1994 | Urbansky . |
| 5,283,787 | 2/1994 | Fletcher et al. . |
| 5,291,468 | 3/1994 | Carmon et al. . |
| 5,428,649 | 6/1995 | Cecchi . |
| 5,621,805 | 4/1997 | Loh et al. . |
| 5,729,578 | 3/1998 | Oshita . |
| 5,732,107 | 3/1998 | Phillips et al. . |

*Primary Examiner*—Vivian Chang

[57] ABSTRACT

Decimation and interpolation of pulse code modulated (PCM) digital audio samples is performed by periodically skipping or repeating a single PCM value. A random access memory (RAM) acting as a FIFO buffer memory outputs PCM samples in response to an address output from a counter. A predetermined number of PCM samples are output from the FIFO buffer by incrementing the counter at a constant rate. Decimation is performed by doubling the incrementing rate for one read interval, and interpolation is performed by halting the incrementing for one read interval. Modifying the incrementing rate of the counter provides an economical implementation of decimation and interpolation without introducing distortion.

26 Claims, 6 Drawing Sheets

METHOD AND APPARATUS FOR PERFORMING DECIMATION AND INTERPOLATION OF PCM DATA

FIELD OF THE INVENTION

The present invention relates to synchronizing digital audio data with digital video data. More specifically, the invention relates to decimating and interpolating pulse code modulated (PCM) samples of audio data from a buffer memory for synchronization with video data prior to generating an audio-visual output perceptible by a user.

DESCRIPTION OF THE RELATED ART

Digital video systems provide enhanced features to users, such as interactive multimedia, video on demand, etc. Such systems receive frames of data carrying digital audio and digital video information. The digital frames, typically received as compressed MPEG packets, are decompressed, decoded, and output to digital to analog converters to generate the desired audio and video signals.

Synchronization is periodically performed between the decoded audio and video frames. One conventional technique for synchronizing pulse code modulated (PCM) samples of audio data with video data is by performing decimation and interpolation.

FIG. 1A is a diagram of PCM audio samples 10. The PCM samples 10a–10e are a digital representation of an analog waveform, shown as dotted line 12. FIG. 1B is a diagram illustrating first order decimation, where digital filters are used to generate (N—1) samples 14a–14d from the original N samples 10a–10e. If the audio stream 10 is lagging behind a video stream, decimation synchronizes the audio stream with a video stream by temporarily reducing the number of PCM samples. This decimation in FIG. 1B is also referred to as four/five decimation, indicating that four samples are generated from the original five samples of FIG. 1A.

FIG. 1C is a diagram illustrating the sequence of PCM samples 16a–16f generated from six/five first order interpolation of the original PCM samples 10A–10E. The samples 16a–16f representing the original analog waveform 12 enable a digital audio stream to be "slowed down" to synchronize with a video data stream.

As known in the art, digital filters of first or higher order provide the best signal to noise performance for decimation and interpolation of the original PCM sequence shown in FIG. 1A. Such digital filters, however, are costly from a hardware standpoint because an additional adder and multiplier are necessary to calculate the new PCM values within the sequence 10a–10e. Higher order filters require even more hardware, or require additional computing time.

An alternative synchronization technique uses a first in first out (FIFO) buffer having a write counter and a read counter that store write and read addresses, respectably. The FIFO buffer writes each received PCM value at the address specified by the write counter, and then increments the write address stored in the write counter. Similarly, the FIFO buffer responds to a read request by outputting the PCM value stored at the address identified in the read counter, and incrementing the read address stored in the read counter. Thus, the FIFO buffer is empty when the read counter catches up to the write counter, and the FIFO buffer is full when the write counter catches up to the read counter, assuming the read and write counters and the FIFO buffer have wrap-around capabilities.

Decimation and interpolation can be performed in the FIFO by ignoring underflow and overflow conditions in the FIFO buffer, hence skipping and repeating the entire contents of the FIFO buffer, respectively. Specifically, interpolation is performed when the read address increments past the value of the write address, causing a repeated reading of the block of data in the FIFO buffer, referred to as block repeat interpolation. An example of block repeat interpolation is shown in FIG. 2. Conversely, decimation occurs when the write address increments past the value of the read address, causing the block of data stored in the FIFO buffer to be skipped, referred to as block skip decimation. Thus, interpolation or decimation is performed automatically whenever the FIFO buffer starves or overflows.

Although the FIFO buffer overflow/underflow technique of block repeat interpolation and block skip decimation requires almost no extra hardware to implement, a substantial amount of noise is introduced into the PCM sample stream. As shown in FIG. 2, performing block repeat interpolation results in the introduction of a discontinuity at event 18, substantially reducing the signal to noise ratio of the output PCM sample stream.

Thus, the use of a FIFO buffer to perform block skip decimation and block repeat interpolation is economical, but severely distorts the analog waveform 20. Attempts to use first or higher order filters substantially increase the cost of the apparatus.

DISCLOSURE OF THE INVENTION

There is a need for decimation and interpolation of PCM data implemented in an economical manner without introducing a substantial amount of noise or distortion.

There is also a need for decimation and interpolation of a sequence of PCM samples implemented with minimal hardware modifications.

These and other needs are met by the present invention, which executes interpolation and decimation by repeating or skipping a data sample after outputting from a buffer memory a predetermined number of data samples of a data sequence. According to one aspect of the present invention, a method for outputting a sequence of data samples from a buffer memory comprises outputting a predetermined number of samples from the buffer memory, selectively decimating the sequence by skipping a single data sample between outputting the predetermined number of samples, and selectively interpolating by repeating a single data sample between outputting the predetermined number of samples. The present invention thus enables decimation or interpolation by skipping or repeating a single data sample between steps of outputting the predetermined number of samples, minimizing the amount of distortion introduced into the sequence of data samples while at the same time providing a relatively simple implementation of decimation and interpolation.

Another aspect of the present invention provides a method for modifying a data rate of serial data samples having a predetermined output rate, comprising first reading a first predetermined number of serial data samples stored in a buffer memory by incrementing a counter value at predetermined intervals corresponding to the output rate and addressing the buffer memory with the incremented counter value, second reading a second predetermined number of the samples after the first reading step by modifying the incrementing of the counter value and addressing the buffer memory with the counter value having the modified incrementing, the second predetermined number substantially less than the first predetermined number, and repeating the first reading step after the second reading step. The present invention thus modifies the data rate of serial data samples without changing a predetermined output rate of a buffer memory, enabling synchronization of the serial data samples with other sources, such as video data.

Still another aspect of the present invention provides an apparatus outputting an address signal to a buffer memory, comprising a counter that increments and outputs a stored count value in response to an increment signal, whereby the address signal is generated in response to the stored count value, and a state machine for generating the increment signal, including an incrementing portion for generating a predetermined number of increment signals at an increment rate equal to a buffer output data rate for a predetermined interval, and a synchronization portion, responsive to a synchronization signal, for selectively changing the increment rate during a synchronization interval substantially less than and between the predetermined intervals. The present invention thus enables the increment rate of a counter to be selectively changed in order to synchronize data stored in a buffer memory in accordance with a synchronization signal. Moreover, distortion is minimized by changing the increment rate during a synchronization interval between the predetermined intervals, whereby the synchronization interval is substantially less than each of the predetermined intervals.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

Reference is made to the attached drawings, wherein elements having the same reference numeral designations represent like elements throughout, and wherein.

BEST MODE FOR CARRYING OUT THE INVENTION

The present invention provides synchronization of audio pulse code modulated (PCM) samples with digital video data by performing periodic decimation and interpolation of the audio PCM values. Decimation and interpolation are performed by periodically skipping or repeating a single PCM value. As discussed below, decimation and interpolation are performed by modifying the read address of a random access memory used as a FIFO buffer memory. A predetermined number of PCM samples are output from the FIFO buffer by incrementing the counter at a constant rate. Decimation is performed by doubling the incrementing rate for one read interval, and interpolation is performed by halting the incrementing for one read interval. Modifying the incrementing rate of the counter provides an economical implementation of decimation and interpolation without introducing distortion.

Figure 3:
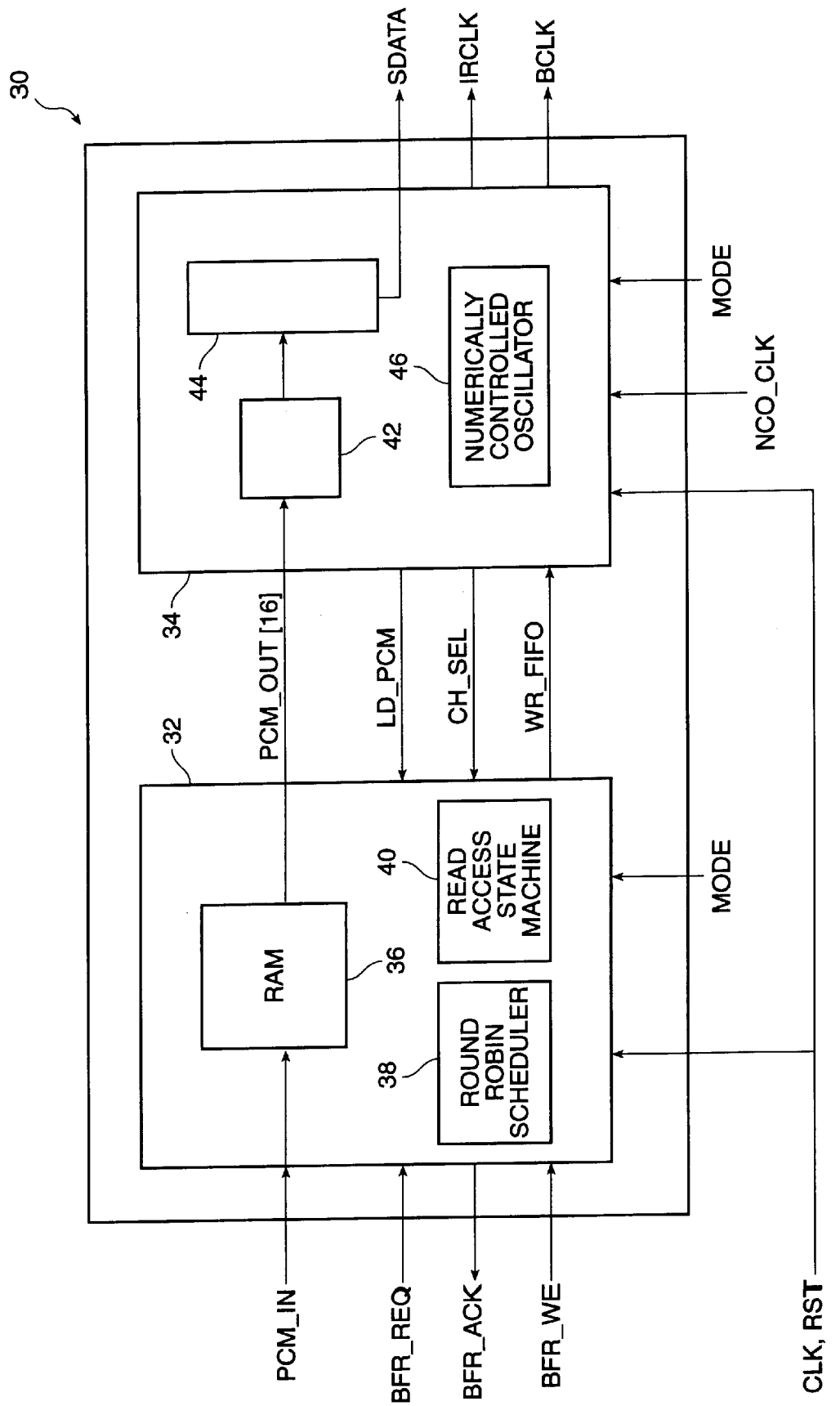
FIG. 3 is a block diagram of an audio output apparatus according to an embodiment of the present invention.

FIG. 3 is a block diagram of an audio output circuit 30 that receives digital audio data as PCM samples (PCM_IN) from an audio decoder (not shown). The audio output circuit 30 includes an audio output buffer 32 and an audio serial output controller 34. The audio output buffer 32 includes a random access memory (RAM) 36 that receives the audio PCM samples, a round robin scheduler 38 and a read access state machine 40. The RAM 36 may be implemented as either a static RAM or a dynamic RAM. The round robin scheduler 38 controls the writing of PCM samples into the RAM 36 in response to a buffer write request (BFR_REQ) signal and a buffer write enable (BFR_WE) signal from the audio decoder.

Communication between the audio decoder and the audio output circuit 30 is performed by transfer of frames of audio data. A frame of audio data includes up to sixty four 16-bit words of PCM data, preferably 32 words for a left channel and 32 words for a right channel. According to the disclosed embodiment, the words of a frame alternate between the two channels, beginning with the left channel.

When the audio decoder has a frame of data ready for output, the audio decoder asserts the buffer request signal (BFR_REQ) (all disclosed signals are active high). When at least 64 words are available in the RAM 36, the audio output buffer 32 will acknowledge using the buffer acknowledge signal (BFR_ACK). The decoder will respond by asserting a buffer write enable (BFR_WE) during each clock cycle that PCM data is transmitted for writing into the RAM 36. After the PCM data has been transferred to the RAM 36, the decoder deasserts the buffer request (BFR_REQ) and buffer writer enable (BFR_WE) signals at the same time.

The read access state machine 40 controls the reading of data from the RAM 36 to the audio serial output controller 34. The audio serial output controller 34 includes a holding register 42 that temporarily stores the PCM output data from the RAM 36, a shift register 44 that converts each 16-bit PCM sample to a stream of serial data (SDATA), and a numerically controlled oscillator 46 that controls the timing of the shift register 44 in response to an externally supplied clock (NCO_CLK).

The read access state machine 40 controls the output of data from the RAM 36 in response to a load PCM control signal (LD_PCM) and a mode signal. The load PCM signal (LD_PCM) is asserted when the audio serial output controller 34 is ready to receive the next PCM sample from the RAM 36. The mode signal identifies the play mode being performed, and includes 2 bits to identify whether to increase (decimation flag) or decrease (interpolation flag) the play speed of the PCM sequence.

Figure 2:
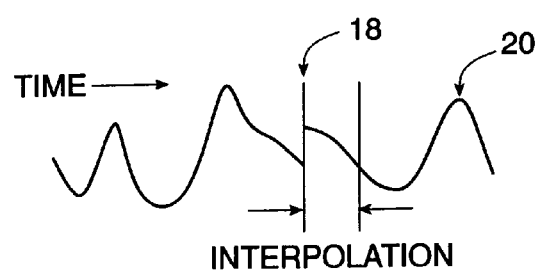
FIG. 2 is a diagram illustrating an analog waveform having distortion added by block repeat interpolation.
Figure 4:
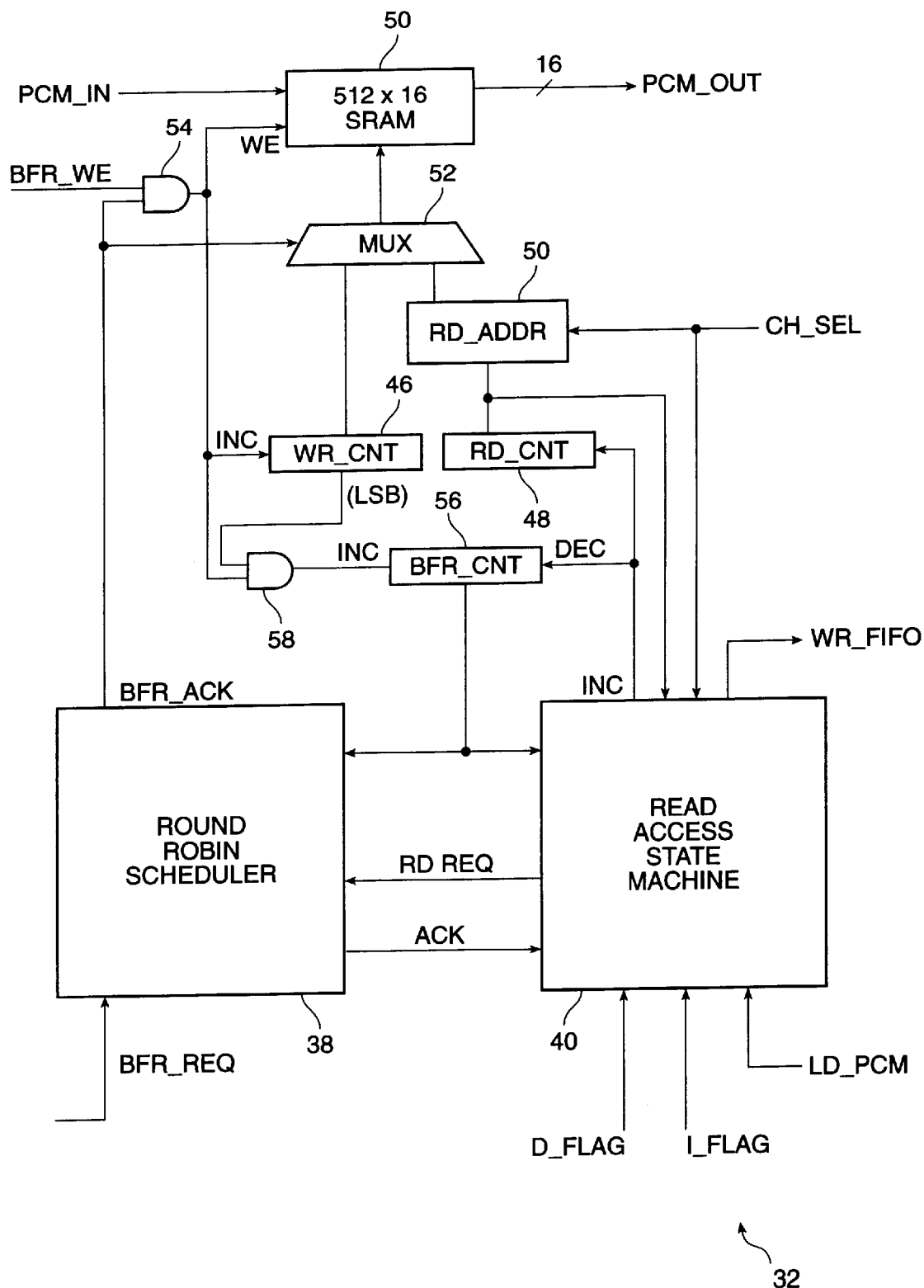
FIG. 4 is a block diagram of the audio output buffer of FIG. 3.

FIG. 4 is a detailed block diagram of the audio output buffer 32 of FIG. 2. The Round Robin Scheduler 38 controls the writing of the PCM samples into the RAM 36, and performs handshaking with the read access state machine 40 by acknowledging read requests ($RD_{13}$ REQ) from the read access state machine 40.

The RAM 36 operates as a FIFO buffer by using a write counter ($WR_{13}$ CNT) 46 and a read counter portion formed by a read counter 48 and a read address register 50. The write counter 46 and the read address register 50 output 9-bit write and read addresses, respectively, to a multiplexer 52. When a new PCM value is to be received, the round robin scheduler 38 responds to the buffer request (BFR_REQ) signal by outputting the buffer acknowledgement signal (BFR_ACK). The multiplexer 52 selects the write address from the write counter 46 in response to the buffer acknowledgement signal (BFR_ACK), and provides the selected address (ADDR) to the RAM 36. An AND gate 54 outputs the write enable signal (WE) to the RAM 36 in response to the buffer acknowledgement signal (BFR_ACK) and a buffer write enable signal (BFR_WE) from an audio decoder. The received PCM sample is then written into the RAM 36 in response to the write enable signal (WE). The output signal of the AND gate 54 also increments the write counter 46.

The PCM samples received from the audio decoder are interleaved as sample pairs such that left channel PCM samples are placed at even addresses, and right channel PCM samples are placed at odd addresses. A buffer counter 56 (BFR_CNT) serves as a pointer for the PCM sample pairs, and is incremented in response to an output signal from an AND gate 58. The AND gate 58 outputs an increment signal when the output signal from the AND gate 54 is high and the least significant bit of the write counter value is high, indicating the write counter address is odd.

Reading from the RAM 36 is controlled by the read access state machine 40. The read access state machine initiates a read operation in response to a load PCM (LD_PCM) signal from the audio serial output controller 34, shown in FIG. 3. As described below, the read access state machine 40 outputs an increment signal (INC) to increment the read counter 48 and decrement the buffer counter 56. The 8-bit count value from the read counter 48 is supplied to a read address register 50, which combines the 8-bit count value with a one-bit channel select signal representing the left and right audio channels. A left channel PCM value is designated by a channel select equal to zero, and a right channel PCM value is designated by a channel select signal equal to one. The read address register 50 outputs a combined address signal including the value output by the read counter 48 and the 1-bit channel select value. The combined read address signal is used to access the RAM 36 by the multiplexer 52 when a write operation is not in process, i.e., when the buffer acknowledge signal (BFR_ACK) from the round robin scheduler 38 is low.

Figure 1A:
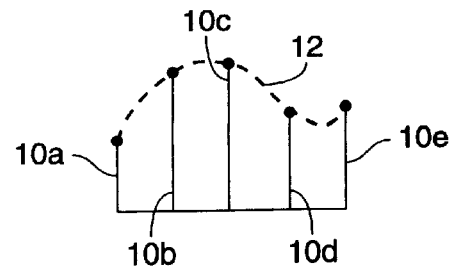
FIGS. 1A, 1B and 1C are diagrams illustrating original, decimated, and interpolated sequences of pulse code modulated (PCM) data samples, respectively.
Figure 1B:
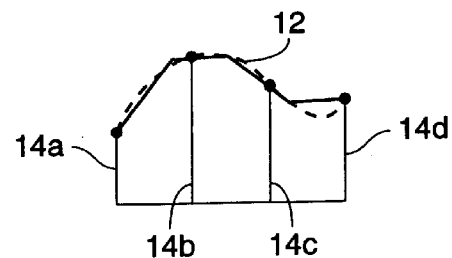
Figure 1C:
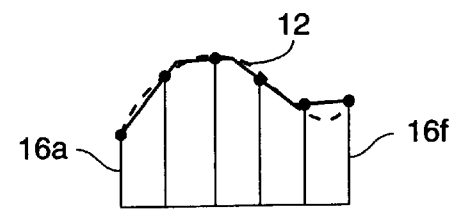
Figure 6A:
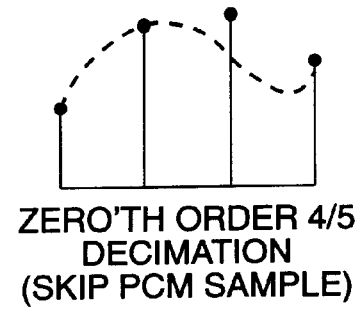
FIGS. 6A and 6B are illustrations of decimated and interpolated sequences of PCM samples according to the present invention, respectively.
Figure 6B:
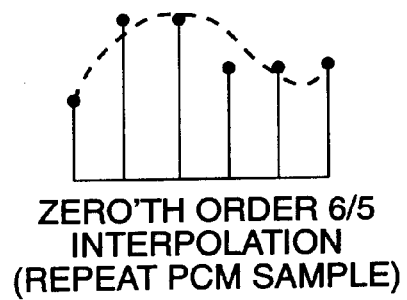

Under normal operation, the read access state machine 40 will increment the read counter 48 (and decrement the buffer counter 56) after reading a pair of PCM samples from the RAM 36. According to the present invention, the incrementing rate can be selectively changed by performing interpolation or decimation to synchronize the output PCM data (PCM_OUT) to a separate video stream. The audio stream (PCM_OUT) data rate is increased in response to the decimate flag (D_FLAG), and decreased in response to the interpolate flag (I_FLAG), received as separate bits of the mode signal of FIG. 3, by controlling the increment signal (INC) generated by the read access state machine. Specifically, the read access state machine decimates the sequence of data samples output from the buffer memory 36 (PCM_OUT) by skipping a single sample in the buffer memory every 16 samples. Similarly, the read access state machine 40 interpolates the sequence of data samples (PCM_OUT) by repeating a single data sample in the buffer memory every 16 samples. Examples of 4/5 decimation and 6/5 interpolation according to the present invention of the sequence of FIG. 1A are shown in FIGS. 6A and 6B, respectively. Thus, the present invention enables decimation and interpolation to be performed with minimal hardware modifications.

Figure 5:
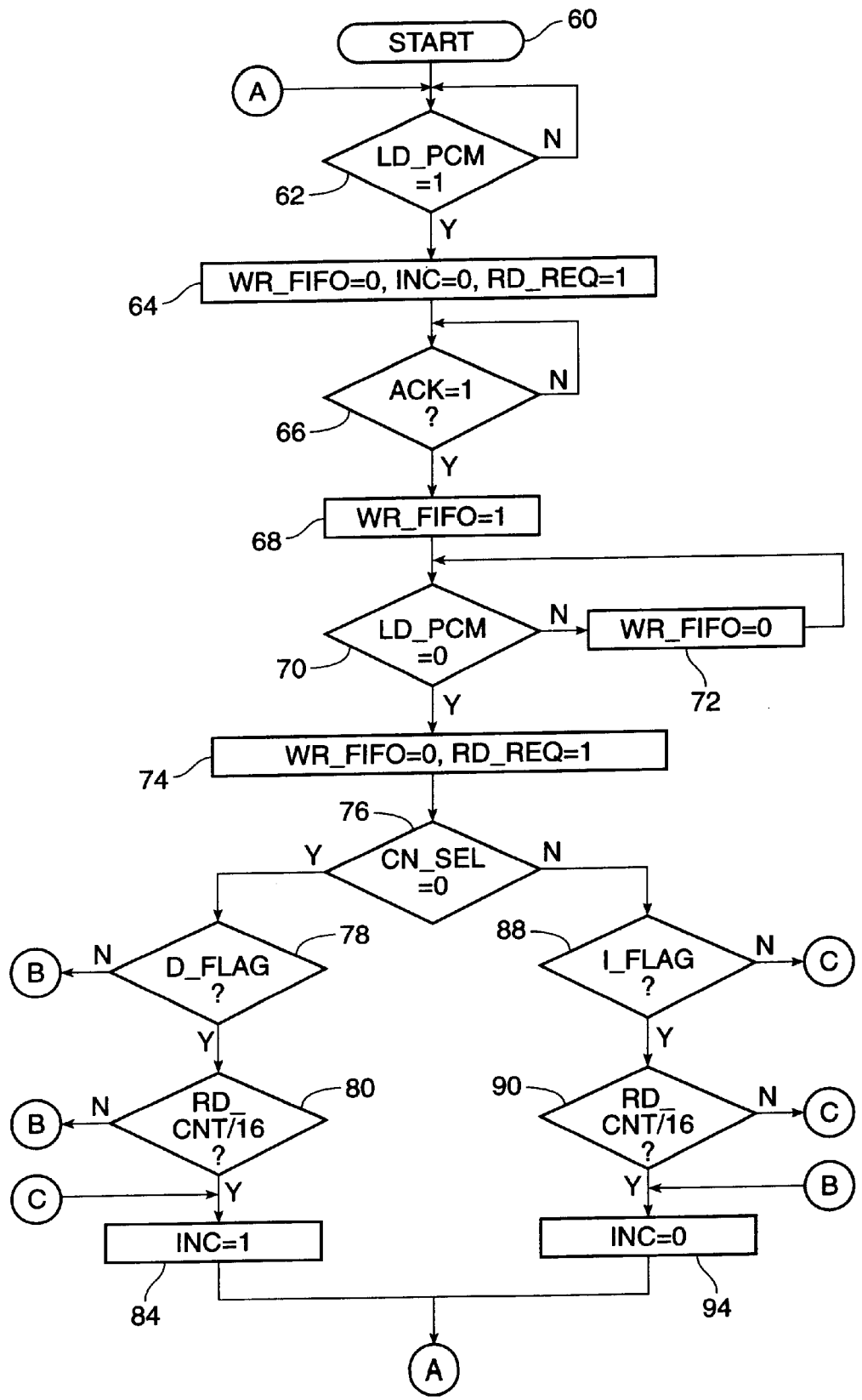
FIG. 5 is a flow diagram illustrating the method of decimating and interpolating by the read access state machine of FIG. 4.

FIG. 5 is a flow diagram illustrating the operation of the read access state machine 40, whereby the read access state machine 40 starts at step 60 by initiating all internal flip-flops to zero. The read access state machine 40 enters a first idle state by determining in step 62 whether a load PCM signal (LD_PCM) having a logic value 1 has been received from the audio serial output controller 34 of FIG. 3. If the load PCM signal has been received, a read request signal (RD_REQ) is generated in step 64 and output to the round robin scheduler 38. The read access state machine 40 then enters a second wait state in step 66 to wait for an acknowledgment signal (ACK) from the round robin scheduler 38. Upon receiving acknowledgement from the round robin scheduler 38, the read access state machine 40 sends a write FIFO signal (WR_FIFO) in step 68, indicating that the FIFO buffer 36 is ready to write data to the controller 34.

The read access state machine 40 then enters a third wait state in step 70 to wait for the load PCM signal (LD_PCM) to be reset to zero, indicating completion of the read operation for the PCM sample. During this wait state, the write FIFO signal (WR_FIFO) is reset to zero in step 72. Once the load PCM (LD_PCM) signal is reset to zero, the read access state machine 40 resets the read request signal (RD_REQ) to zero in step 74.

Since the PCM samples are interleaved with left and right sample pairs with left channel PCM values at even addresses and right channel PCM values at odd addresses, the read access state machine 40 determines in step 76 whether the channel select signal (CH_SEL) is equal to zero, indicating a left channel PCM value. If the channel select value is zero, the read access state machine 40 then checks in step 78 whether the decimate flag is set.

If the decimate flag is set, the read access state machine 40 determines in step 80 whether the count value (RD_CNT) stored in the read counter 48 is divisible by 16 by checking whether the least four significant bits of the count value (RD_CNT[0–3]) equal zero. Specifically, the present invention performs decimation by skipping a single count value after a predetermined number of samples of the PCM data sequence have been output from the buffer memory 36. Thus, decimation occurs only after 16 PCM sample pairs have been read from the memory 36.

If the count value (RD_CNT) is not a multiple of 16, the read access state machine 40 in step 80 goes to step 94, and does not generate the increment signal for the read counter 48. However, if in step 80 the internal counter is a multiple of 16, the increment signal is set in step 84 to decrement the read counter 48 and decrement the buffer counter 56.

If in step 78 the read access state machine 40 determines that the decimate flag is not set, the read access state machine 40 jumps to step 94, whereby the internal counter is incremented in step 86 without generating an increment signal for the read counter 48 of FIG. 4. Thus, the next read cycle will access the right PCM sample of the corresponding sample pair by changing the least significant bit of the combined address value, namely the channel select bit (CH_SEL) to one.

During the next read sequence, the read access state machine 40 checks in step 76 whether the channel select bit is equal to zero. In this instance, the channel select bit will be set to one, indicating that the right PCM sample has been read from the memory 36. The read access state machine 40 then checks in step 88 whether the interpolate flag has been set. If not, the read access state machine 40 jumps to step 84 to generate the increment signal (INC). If, however, interpolate flag is set in step 88, the count value is checked in step 90 to determine whether the count value (RD_CNT) is a multiple of 16, i.e., whether 16 PCM sample pairs have been output from the RAM 36. If the predetermined number of sample pairs have not been read from the memory 36, the read access state machine 40 jumps to step 84. If, however, the predetermined number of samples have been read from the FIFO 36, the increment signal (INC) is held at zero value in step 94. Thus, the generation of the increment signal (INC) is halted during the synchronization interval wherein the internal counter value CNT or (CNT minus 1) is a multiple of 32.

Thus, decimation is performed by periodically skipping a single data sample in the buffer memory 36. This is performed by incrementing the read counter 48 in step 84 at the time the channel select bit is reset at zero. Similarly, interpolation is performed by periodically repeating a single data sample in the buffer memory 36. The repeating of the single data sample is performed by halting the incrementing of the read counter 48 in step 94, as opposed to the normal operation, whereby the read counter 48 is incremented by generation of the increment signal after reading the right PCM value.

Table 1 provides a comparison between normal increment operations with decimation and interpolation values generated by modifying the incrementing of the counter value in the read counter 48.

TABLE 1

| RD_CNT | CH_SEL | RD_ADDR |
| --- | --- | --- |
| Normal Operation | | |
| 0 | 0 | 0 |
| 0 | 1 | 1 |
| 1 | 0 | 2 |
| 1 | 1 | 3 |
| 2 | 0 | 4 |
| Decimation | | |
| 0 | 0 | 0 |
| 1 | 1 | 3 |
| 2 | 0 | 4 |
| Interpolation | | |
| 0 | 0 | 0 |
| 0 | 1 | 1 |
| 0 | 0 | 0 |
| 0 | 1 | 1 |
| 1 | 0 | 2 |
| 1 | 1 | 3 |

As shown on Table 1, decimation is executed by skipping the PCM sample from each of the left right channel. Thus, the left channel PCM sample at address 2 and the right channel PCM sample at address 1 are skipped. The read counter is incremented only when the channel select value is high, i.e., immediately after a right channel PCM sample has been read from the FIFO memory 36.

Decimation is performed by periodically incrementing the read counter 48 after reading a left channel PCM signal. Thus, when the four at least significant bits of the counter value in a read counter 48 are zero and channel select is low, the read counter is incremented in step 84, resulting in a 16/17 decimation. Note that the corresponding right channel PCM value will never be read, but the next read is a right channel PCM sample of the next PCM pair in the FIFO. Similarly, the corresponding left PCM sample of the next right channel PCM sample is never read.

Interpolation is performed by holding the increment signal to zero (INC=0) in step 94 when the four least significant bits of the stored count value in the read counter 48 are all zero and channel select is high, resulting in a 17/16 interpolation. During the following cycle the interpolate flag is set at back to zero and the read counter advances normally for the next 16 cycles.

Figure 7A:
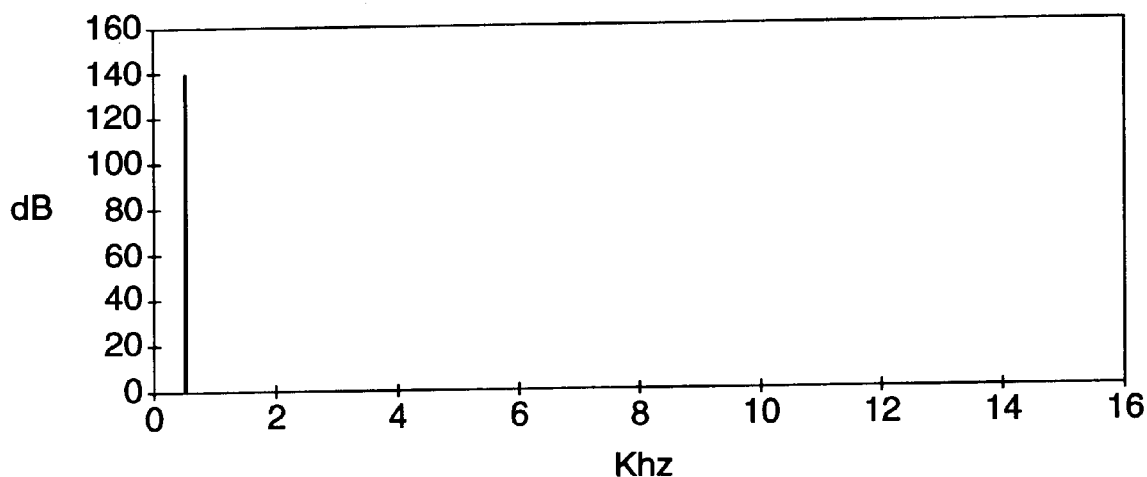
FIGS. 7A, 7B and 7C are frequency spectrum diagrams of a sine wave, a block skip-decimated sine wave, and a sine wave decimated according to the present invention, respectively.
Figure 7B:
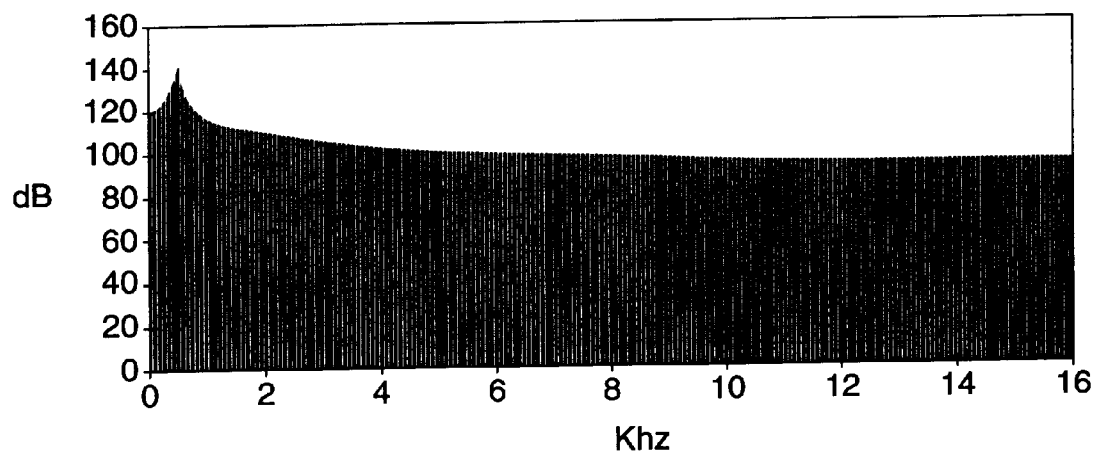
Figure 7C:
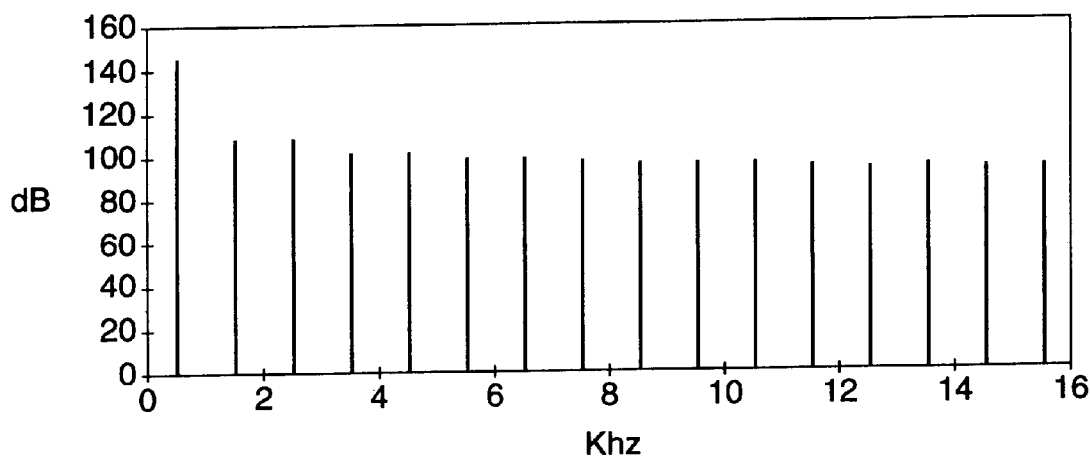

FIGS. 7A, 7B and 7C illustrate the noise reduction by performing 16/17 decimation using the PCM skip technique of the present invention. FIG. 7A is a frequency domain spectrum of a sine wave calculated by converting a 1024 point time domain signal into a 512 point frequency domain signal using an FFT algorithm. The period of the sine wave is 64 samples. Thus, for a sampling frequency of 44.1 kHz, the sine wave of FIG. 7A corresponds to an audible tone at 41.1 kHz/32, or about 0.7 kilohertz.

FIG. 7B illustrates the resulting power frequency spectrum of the sine wave of FIG. 7A at less than 0.7 kHz (by a factor of 16/17) which is decimated up to a frequency of 0.7 kilohertz using block skip (512/544) decimation according to the prior art. This block skip decimation corresponds to a FIFO size of 32 PCM pairs, where the write machine is writing 544 PCM pairs in the amount of time that only 512 PCM pairs are read from the FIFO. Eventually the write counter will pass the read counter (from behind) and 32 PCM pairs will be lost. As shown in FIG. 7B, a substantial amount of distortion is added to the sine wave of FIG. 7A.

FIG. 7C shows the power frequency spectrum of the sine wave of FIG. 7A at less than 0.7 kilohertz, decimated up to a frequency of 0.7 kilohertz by skipping a single PCM sample every 16 samples (16/17 decimation) according to the present invention. As shown in FIG. 7C, the harmonic distortion is substantially less than a prior art technique shown in FIG. 7B, due to the fact that the corrections in the PCM samples are performed 32 times as often, so that harmonics are spaced 32 times further apart. Similar results can be obtained from the analysis of the corresponding interpolation techniques.

Thus, while the overall synchronization time lasts 32 times longer than the block skip technique, the perceived change is negligible.

Thus, the present invention provides an economic implementation of interpolation and decimation techniques that minimizes the added distortion during synchronization.

The disclosed embodiment is not necessarily limited to interleaved samples of left and right channel audio data, but can be applied to other addressing arrangements. For example, the memory 36 can be arranged as a segmented memory, with the most significant bit of the address value indicating left or right audio signals. Further, the disclosed embodiment is not limited to decimating and interpolating audio samples of PDM data, but can be applied to other serial samples of digital data.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

We claim:

1. A method for modifying a data rate of serial data samples stored in a buffer memory and having a predetermined output rate, comprising:

(1) reading a first predetermined number of serial data samples out of the buffer memory, including incrementing a counter value at predetermined intervals corresponding to the output rate, and addressing the buffer memory with the incremented counter value;

(2) reading a second predetermined number of said samples out of the buffer memory after the first reading step by modifying the incrementing of the counter value and addressing the buffer memory with the counter value having the modified incrementing, the second predetermined number being substantially less than the first predetermined number; and (3) repeating step (1), wherein modifying includes halting incrementing of said counter value, said samples are audio pulse code modulated (PCM) samples, said second predetermined number equals a pair of said PCM samples, and incrementing includes toggling the least significant bit of the counter value in response to a channel select signal and incrementing the next least significant bit at said predetermined intervals having a duration equal to an interval for outputting the pair of PCM samples.

2. The method of claim 1, wherein said first predetermined number equals sixteen pairs of the PCM samples.

3. A method for modifying a data rate of serial data samples stored in a buffer memory and having a predetermined output rate, comprising:

(1) reading a first predetermined number of serial data samples out of the buffer memory, including incrementing a counter value at predetermined intervals corresponding to the output rate, and addressing the buffer memory with the incremented counter value;

(2) reading a second predetermined number of said samples out of the buffer memory after the first reading step by modifying the incrementing of the counter value and addressing the buffer memory with the counter value having the modified incrementing, the second predetermined number being substantially less than the first predetermined number; and (3) repeating step (1);

wherein modifying includes incrementing the counter value by two count units within the predetermined interval.

4. The method of claim 3, wherein said samples are audio pulse code modulated (PCM) samples and said second predetermined number equals a pair of said PCM samples.

5. The method of claim 4, wherein the incrementing step comprises toggling a least significant bit of the counter value in response to a channel select signal, and incrementing a next least significant bit at said predetermined intervals equal to an interval for outputting the pair of PCM samples.

6. The method of claim 5, wherein said modifying further comprises incrementing the next least significant bit after toggling the least significant bit of the counter value to one.

7. The method of claim 6, wherein said first predetermined number equals sixteen pairs of the PCM samples.

8. A method for addressing a data buffer containing serial data samples to output the serial data samples at a predetermined output rate, comprising:

outputting from a counter a stored counter value supplied to address the data buffer;

incrementing the stored counter value by:

(1) incrementing the counter value at a predetermined rate for a first predetermined number of increment cycles;

(2) selectively changing the incrementing rate for one increment cycle after the first predetermined number of increment cycles are produced;

(3) repeating step (1); and (4) adding to each counter value a channel select signal that toggles at the predetermined output data rate to obtain a combined address signal for addressing the data buffer.

9. The method of claim 8, wherein the selectively changing step comprises decimating by incrementing the stored counter value at twice the buffer output data rate for the one increment cycle.

10. The method of claim 8, wherein the selectively changing step comprises interpolating by suspending the incrementing of the stored counter value for the one increment cycle.

11. An apparatus for synchronizing data samples, comprising:

a counter coupled to said buffer memory which increments and outputs a stored count value in response to an increment signal, the stored count value used to address said buffer memory; and a read access device coupled to said counter generating the increment signal by generating a predetermined number of the increment signals at an increment rate equal to a buffer output data rate for a predetermined interval, and selectively changing the increment rate, responsive to a synchronization signal, wherein the the read access device suspends generation of the increment signal during a synchronization interval, and generates a single one of the increment signals at twice the buffer output data rate during the synchronization interval.

12. The apparatus of 11, further comprising a register combining the output stored count value with a channel select value to form said address signal.

13. The apparatus of 12, wherein the read access device generates said single one of the increment signals substantially when said channel select value is set.

14. The apparatus of 13, wherein the read access device begins generating the predetermined number of increment signals after said single one of the increment signals when said channel select value is reset.

15. The apparatus of 14, wherein said channel select value is a least significant bit of said address signal.

16. A method for modifying a data rate of serial data samples having a predetermined output rate, wherein the samples are audio pulse code modulated (PCM) samples), said method comprising:

(1) reading a first predetermined number of serial data samples stored in a buffer memory, comprising incrementing a counter value at predetermined intervals corresponding to the output rate, and addressing the buffer memory with the incremented counter value, wherein the incrementing step comprises toggling the least significant bit of the counter value in response to a channel select signal, and incrementing the next least significant bit at said predetermined intervals having a duration equal to an interval for outputting the pair of PCM samples;

(2) reading a second predetermined number of said samples after the first reading step by modifying the incrementing of said counter value and addressing the buffer memory with the counter value having the modified incrementing, the second predetermined number being substantially less than the first predetermined number and equals a pair of said PCM samples and wherein the modifying comprises halting incrementing of said counter value; and repeating step (1).

17. A method for modifying a data rate of serial data samples having a predetermined output rate, wherein the samples are audio pulse code modulated (PCM) samples), said method comprising:

(1) reading a first predetermined number of serial data samples stored in a buffer memory, comprising incrementing a counter value at predetermined intervals corresponding to the output rate, and addressing the buffer memory with the incremented counter value, wherein the incrementing step comprises toggling the least significant bit of the counter value in response to a channel select signal, and incrementing the next least significant bit at said predetermined intervals having a duration equal to an interval for outputting the pair of PCM samples;

(2) reading a second predetermined number of said samples after the first reading step by modifying the incrementing of said counter value and addressing the buffer memory with the counter value having the modified incrementing, the second predetermined number being substantially less than the first predetermined number and equals a pair of said PCM samples and wherein the modifying comprises incrementing the counter value by two count units within the predetermined interval; and repeating step (1).

18. The method of claim 17, wherein said modifying further comprises incrementing the next least significant bit after toggling the least significant bit of the counter value to one.

19. The method of claim 18, wherein said first predetermined number equals sixteen pairs of the PCM samples.

20. A method for addressing a data buffer outputting serial data samples at a predetermined output rate, comprising:

outputting from a counter a stored counter value supplied to address a data buffer;

incrementing the stored counter value by:
(1) incrementing the counter value at a predetermined rate for a first predetermined number of increment cycles;
(2) selectively changing the incrementing rate for one increment cycle after the first predetermined number of increment cycles are produced, and
(3) repeating step (1);

adding to each counter value a channel select signal, that toggles at the predetermined output data rate, to obtain a combined address signal for addressing the data buffer.

21. The method of claim 20, wherein the selectively changing step comprises decimating by incrementing the stored counter value at twice the buffer output data rate for the one increment cycle.

22. The method of claim 20, wherein the selectively changing step comprises interpolating by suspending the incrementing of the stored counter value for the one increment cycle.

23. An apparatus outputting an address signal to a buffer memory, comprising:

a counter incrementing an outputting a stored count value in response to an increment signal, the address signal generated in response to said stored count value;

a read access device generating the increment signal by generating a predetermined number of the increment signals at an increment rate equal to a buffer output data rate for a predetermined interval, and selectively changing the increment rate, responsive to a synchronization signal, during a synchronization interval substantially less than and between the predetermined intervals, wherein the read access device suspends generation of the increment signal during the synchronization interval, and generates a single one of the increment signals at twice the buffer output data rate during the synchronization interval; and a register combining the output stored count value with a channel select value to form said address signal.

24. The apparatus of claim 23, wherein the read access device generated said single one of the increment signals substantially when said channel select value is set.

25. The apparatus of claim 24, wherein the read access device begins generating the predetermined number of increment signals after said single one of the increment signals when said channel select value is reset.

26. The apparatus of claim 25, wherein said channel select value is a least significant bit of said address signal.

* * * * *